United States Patent [19]

Hagelthorn

[11] Patent Number: 4,530,144
[45] Date of Patent: Jul. 23, 1985

[54] METHOD FOR ADJUSTING AND RETAINING BEARINGS ON AN AXLE

[76] Inventor: George A. Hagelthorn, P.O. Box 5197, Dearborn, Mich. 48128

[21] Appl. No.: 502,588

[22] Filed: Jun. 9, 1983

[51] Int. Cl.³ .............................................. B23Q 17/00
[52] U.S. Cl. ...................................... 29/407; 384/247; 384/248; 384/249
[58] Field of Search ........................ 384/247, 248, 249; 308/236, 207 A, 189 A; 180/905; 29/149.5 R, 407

[56] References Cited

U.S. PATENT DOCUMENTS

| | | | |
|---|---|---|---|
| 2,972,504 | 2/1961 | Baker | 308/207 A |
| 3,298,757 | 1/1967 | Schmid | 384/236 |
| 3,726,576 | 4/1973 | Barnbrook et al. | 308/207 A |
| 4,231,622 | 11/1980 | Paullin | 384/249 |
| 4,398,862 | 8/1983 | Schroeder | 384/249 |

Primary Examiner—Howard N. Goldberg
Assistant Examiner—Steven Nichols
Attorney, Agent, or Firm—Patrick F. Henry

[57] ABSTRACT

The end of an axle spindle is provided with right hand and left hand threads to receive respective axle nuts. The inner nut thread diameter is larger than the outer nut thread diameter in order to avoid interference. The wheel, bearings and an inner nonrotatable washer on the axle spindle are secured in place by tightening the inner nut to an initial snug (no clearance) condition against the face of the nonrotatable washer. One of eight holes on the outer face of the inner nut receives a projecting pin of a spacing control device which pin projects a predetermined distance. The outer nut is turned until the spacing control device engages one of the eight recesses. Then the flats of both nuts are tightened by a spanner wrench which causes the inner nut to "back off". The method is to create a space between nuts (e.g. by use of a shim spacer) which converts to an appropriate clearance space between the inner nut and nonrotatable washer in the final condition and to maintain that space in the final condition.

6 Claims, 22 Drawing Figures

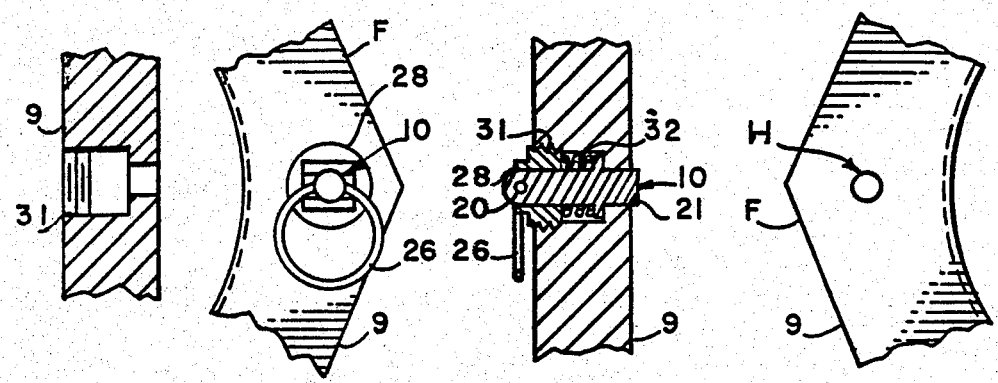
FIG.9  FIG.10  FIG.11  FIG.12
 
FIG.13  FIG.14  FIG.15  FIG.16
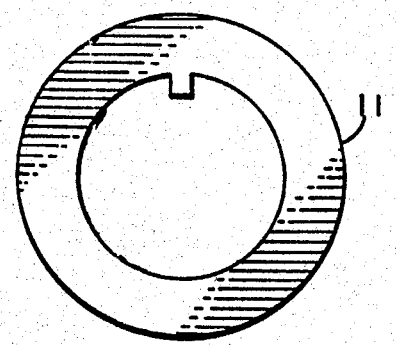 
FIG.17  FIG.18
FIG.19  FIG.20

METHOD FOR ADJUSTING AND RETAINING BEARINGS ON AN AXLE

BACKGROUND OF THE INVENTION

1. Field of the Invention

Wheels and axles, particularly the mounting of the wheel and bearing assembly thereon and the tightening and spacing thereof. A double axle nut positioning system prepositioned to assure proper spacing and clearance for optimum bearing performance.

2. Background of the Invention

Bearing adjustment on vehicle axles is critical and has always been achieved through manual selective positioning of the axle nut performed by the mechanic at the time of assembly according to a recommended practice which is subject to variations caused by the mechanic's interpretation of the procedure, his visual inspection of the initial conditions, his dexterity, and his strength. Furthermore, some axle nuts currently in use are so similar to standard nuts that their installation by the uninitiated or untrained mechanic would possibly be performed in the conventional manner which provides a torsional force to achieve a final tightness. Failure to provide an adjusted clearance or space will lead to bearing problems resulting from excessive heat generated by the "tight" assembly. In many instances, the overheating of the bearings has reached combustion temperature of the lubricating oil or grease and the ensuing fire caused major damage to the axle and sometimes the vehicle.

OBJECTIVES AND SUMMARY OF THE INVENTION

A primary objective of this invention is to provide the means to establish the exact predetermined clearance needed in the wheel and axle assembly to assure optimum bearing performance.

A second objective of this invention is to introduce a system which will not require a measuring process on the part of the mechanic to achieve the correct bearing adjustment in the assembled wheel and axle configuration.

Another objective of this invention is to provide a locked condition of the axle nut assembly which is secure and not subject to movement by dynamic forces or vibration.

Still another objective of this invention is to provide an axle nut assembly installation which once installed and secured in its self-locking condition will require manual force to effect disassembly.

An additional objective of this invention is to provide an interlock arrangement which enables disengagement of the inner nut from the outer nut spacing control device portion of the assembly at a point prior to overtightening the inner nut as the outer nut is being loosened.

A further objective of this invention is to provide a positive connection between the inner and outer nuts by installing a fastener which physically connects the two nuts together.

One means for achieving the above-stated objectives is accomplished by employing an axle nut system which consists of two special nuts, a spacing control device within the outer nut assembly, and a fastener to secure the two axle nuts together. The two nuts are threaded to mate with respective accommodating threads on the axle spindle, one nut having right hand threads and the other having left hand threads. The inner nut thread diameter is larger than the outer nut thread diameter in order to avoid interference. Thus, it is possible to mount the wheel, bearings and the inner nonrotatable washer on the axle spindle and to secure them in position by tightening the inner nut to an initial snug (no clearance) condition against the face of the nonrotatable washer. With the inner nut properly placed in its initial position, eight holes will be visible on the outer face of the inner nut. One of these appropriately sized recesses will serve as the receptacle for the spacing control device. The design of this spacing control device is such that it will project beyond the inner face of the outer nut to the predetermined distance needed to accurately position the outer axle nut to the predetermined distance needed to accurately position the outer axle nut with respect to the inner axle nut prior to the final tightening operation. The outer nut is threaded onto the spindle and is turned until the spacing control device engages one of the eight recesses in the inner nut. The amount of clearance provided by the spacing control device in this freely positioned condition of the axle nut system establishes the amount of bearing clearance to be provided by the final tightening operation. Having physically engaged the outer axle nut with the inner axle nut at the dimensional gap preordained by the spacing control device, the flats of both nuts are engaged with a spanner wrench and they are simultaneously turned in the direction which causes the inner nut to "back off" from its snug (no clearance) condition against the face of the nonrotatable washer. At the same time, the outer nut moves toward the inner nut until the gap established by the spacing control device is closed. With this closure, the spacing control device further engages the hole in the face of the inner nut which will serve to prevent independent movement of the axle nuts. For additional security, a bolted fastener is installed through a clearance hole provided in the outer axle nut into the threaded portion of one of the eight recesses of the inner axle nut. With this assembly, it is not possible for one nut to move independently of the other unless intentional disassembly efforts are employed or if some major force shears the securing fastener. This installation thus provides a precontrolled specified clearance for bearing adjustment, fastened securement between the two axle nuts, and a jammed interlock between the two axle nuts that will be maintained until a positive disassembly procedure is applied.

Disassembly of the self locking and self adjusting axle nut system can be accomplished in a number of ways depending on the design of the spacing control device and its relationship within one of the holes of the inner axle nut. For the purpose of this invention, the configuration of the spacing control device shown is such that it will disengage from its accommodating recess in the inner axle nut by being physically withdrawn. This disengagement must be effected before the outer nut is loosened because the projection of the spacing control device could maintain engagement with the inner axle nut after the inner nut has been snugly retightened. Unless the spacing control device is withdrawn from the recess in which it reposes, the inner axle nut can be overtightened causing damage to the bearings as the outer axle nut is being removed.

Other and further objects of this invention will become apparent upon reading the following description of a preferred embodiment, including the suggested mode of operation, together with the different figures of the drawings.

BRIEF DESCRIPTION OF THE DRAWINGS

FIG. 9 is a sectional view along lines 9—9 of FIG. 7 which details that portion of the outer nut into which the spacing control device is placed as an assembly.

FIG. 10 is a plan view of a portion of the outer nut showing the general appearance of the spacing control device as installed.

FIG. 11 is an enlarged section through the spacing control device, depicting the relative positioning of the parts which comprise it and are shown as FIGS. 13 through FIG. 18.

FIG. 12 is an elevation view of the other side of the outer nut in FIG. 10.

FIG. 13 is a longitudinal plan view of the spacing control device probe which engages one of the inner nut recesses when appropriate spacing is achieved between the inner and the outer axle nuts.

FIG. 14 is an end view of the device in FIG. 13.

FIG. 15 is a plan view of the portion of the spacing control device described as the plug and disengagement cam.

FIG. 16 is a side view of the plug and disengagement cam shown in its plan view in FIG. 15.

FIG. 17 is a plan view of the operating ring by which the spacing control device can be withdrawn from its engagement within one of the eight recesses provided in the outer face of the inner nut.

FIG. 18 is an elevation view of the compression spring shown in FIG. 9.

FIG. 19 is a plan view of the stationary washer which is positioned on the axle spindle between the inner axle nut and the outer bearing in FIGS. 3 and 4.

FIG. 20 is a side elevation view of the washer shown in FIG. 19.

DESCRIPTION OF A PREFERRED EMBODIMENT

Figure 5:
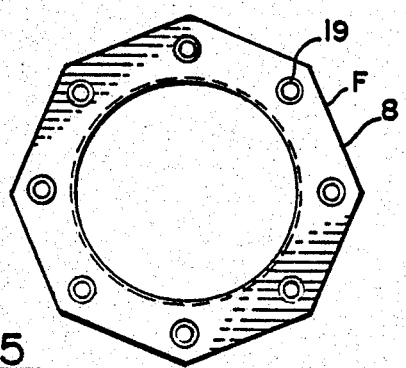
FIG. 5 is a plan view of the inner axle nut showing the round recesses, any of which will accommodate the spacing control device when the correct relative spacing is achieved between the inner nut and the outer nut.
Figure 6:
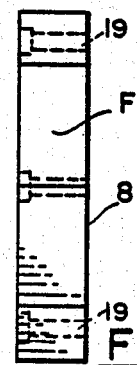
FIG. 6 is a side view of the inner axle nut shown in its plan view as FIG. 5.
Figure 7:
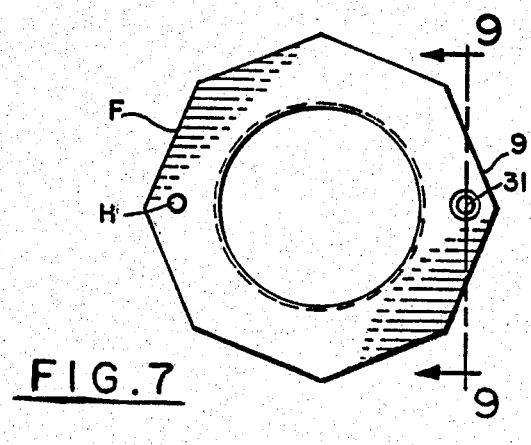
FIG. 7 is a plan view of the outer axle nut showing the hole in which the spacing control device is assembled. The smaller hole accepts the bolt which serves as the securing fastener between the inner nut and the outer nut after the axle nut system is tightened.
Figure 8:
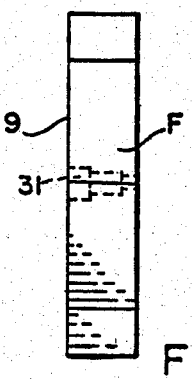
FIG. 8 is a side view of the outer axle nut shown in its plan view as FIG. 7.

An axle beam 1 is provided with outer threads 2 and inner threads 3, a washer keyway 4, an outer bearing surface journal 5, an inner bearing surface journal 6, and an oil seal surface journal 7. Inner threads 3 accommodate the inner axle nut 8 (shown in FIGS. 5 and 6) and the outer threads 2 accommodate the outer nut 9 (shown in FIGS. 7 and 8) which has a retaining hole H. The spacing control device 10 in FIGS. 10 and 11 is shown in detail in FIGS. 3 and 4. Washer keyway 4 serves to engage the inner projection of a washer 11 which is shown in detail in FIGS. 19 and 20.

Figure 1:
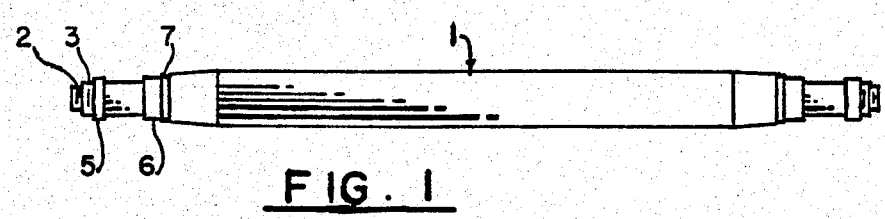
FIG. 1 is a general representation of an axle beam without any accoutrements showing the two spindles in final form following the machining operations.
Figure 2:
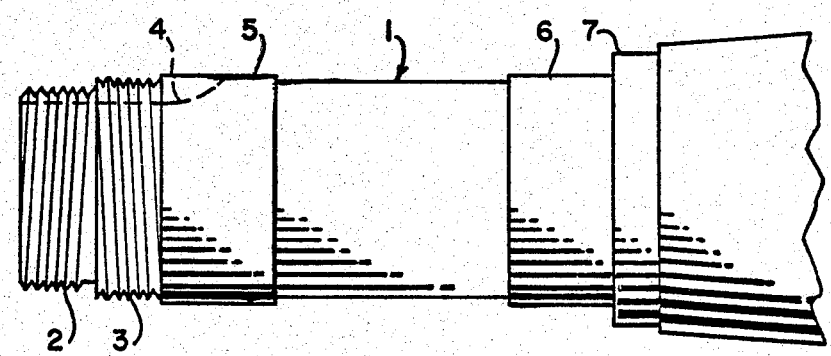
FIG. 2 is an enlarged plan view of one end of the spindle in FIG. 1 showing the double and reversed thread arrangement.
Figure 3:
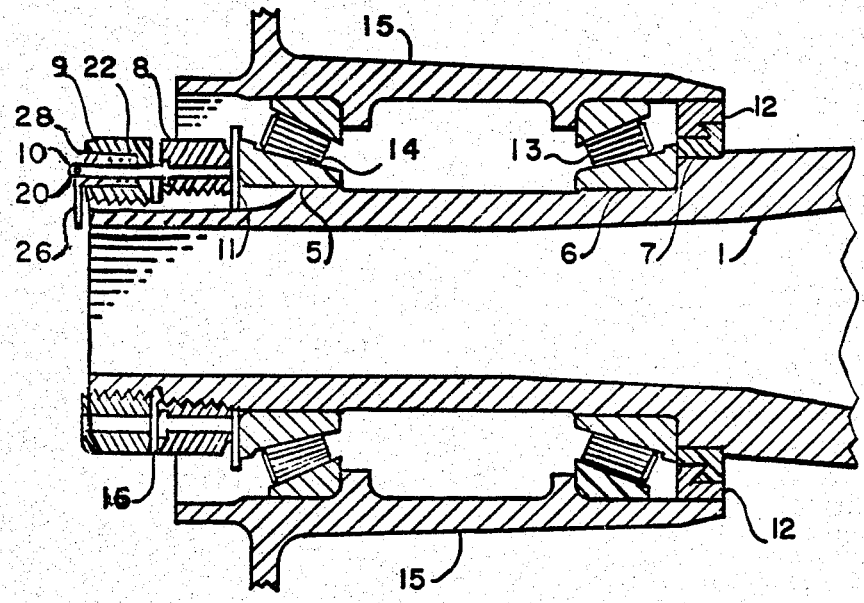
FIG. 3 is a longitudinal section view of the axle spindle in FIG. 1 having assembled thereon the components comprising the wheel and axle assembly showing the relationship of the two axle nuts prior to the final torque application which establishes both the required bearing clearance and the final interlock condition between the two nuts.

Referring to FIG. 3, a wheel seal 12 having inner tapered roller bearing 13 and outer roller bearing 14 is shown in its respective position between a wheel 15 and the oil seal journal 7 of the axle 1. The inner tapered roller bearing 13 is positioned between the wheel 15 and the inner bearing journal 6 of the axle 1 and similarly the outer tapered roller bearing 14 is positioned in its working arrangement between the wheel 15 and the outer bearing journal 5 of the axle 1. There is to be a predetermined space 16 between inner nut 8 and outer nut 9 corresponding to the space 17 in FIG. 4. The axle nut 8 in FIGS. 3 and 6 has recesses 19 (eight altogether) in the face and has been tightened to a torque condition known to be capable of eliminating all degrees of freedom between the assembled components. This is the preload condition which serves as a reference basis from which the final bearing adjustment and clearance are developed.

Figure 4:
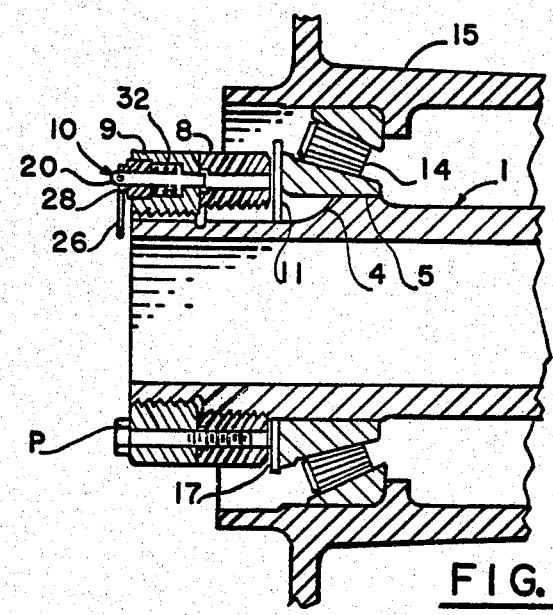
FIG. 4 is a second longitudinal section view of the axle spindle, similar to FIG. 3, but after the two nuts have been partially positioned to achieve both a predetermined bearing clearance and an interlocked condition.

The spacing control device 10 is shown in FIG. 3 with a projecting pin 20 in its initial engagement with one of the recesses 19 (space accommodations) provided in the inner axle nut 8 to a predetermined distance beyond the inner surface of the outer axle nut 9. This establishes the predetermined space 16 between the inner axle nut 8 and the outer axle nut 9 which corresponds and correlates with the exact space requirement 17 shown in FIG. 4 which illustrates the final configuration of all the components in final adjustment and their interlocked condition. The exact space requirement 17 shown in FIG. 4 is provided to assure the desired bearing clearance for optimum bearing performance by the loosening of the inner axle nut 8 from its preload condition shown in FIG. 3 while simultaneously tightening the outer axle nut 9 from its initial relative position with respect to the inner nut 8 as provided by the function of the spacing control device 10.

Spacing control device 10 (see FIGS. 10-18) comprises the projecting pin 20 having a circumferential shoulder 22 and an opening 24 in which is mounted a ring 26 and the engagement probe member 21. The spacing control device 10 is mounted in the outer nut 9 by means of a threaded control member 28 having projections 30 thereon and being threaded into a tapped opening 31 in nut 9 against an adjustment spring 32 which is confined between member 28 and shoulder 22 whereby the rotation of member 20 by means of the ring 26 engages the projection 30 on the member 28 on rotation in one direction or the other to retract the engagement probe member 21 to enable independent removal of nut 9. Positioning the ring 26 in the slot between the turn projection 30 enables the engagement probe 21 to extend the predetermined clearance distance 16 beyond the inner face of nut 9 and to engage a hole 19 in nut 8 at the opposite spacing. A spanner wrench (not shown) which engages both nuts 8, 9 at the same time is used for this final tightening operation. Because the two axle nuts 8, 9 have opposing threads, the outer nut 9 will move toward the inner nut 8 when the inner nut 8 is being rotated from its preload position. As a result, the initial space 16 in FIG. 3 established by the dimension control imposed by the spacing control device 10, or alternative techniques, between the inner nut 8 in its preload condition positioned and the outer nut 9 determines how far the inner axle nut 8 will loosen to produce the exact space requirement 17 in FIG. 4 which occurs when the inner axle nut 8 and the outer axle nut 9 meet one another preventing further rotational movement in a direction which loosens inner axle nuts 8. A conventional hub cap (not shown) serves to enclose the assembly and it would normally engage the outermost projection of the wheel 15 shown in FIGS. 3 and 4.

Two factors affect the amount of bearing clearance developed during the adjustment and tightening operation. One factor is the selection of the appropriate pitch threads on the axle spindle 1 and the axle nuts 8, 9. The thread pitch, coupled with the second factor, the predetermined amount of rotational movement of the pair of axle nuts 8, 9, from the initial positions to the interlocked conditions needed to reposition the inner nut 8 the optimum distance away from the face of the nonrotatable washer 11 to achieve the desired bearing clearance completes the working relationship.

For example, if it is the intent to provide an operating clearance for the tapered roller bearings between 0.002 and 0.008 inches, a pitch of 18 threads per inch could be selected for the inner axle nut 8. Rotational movement of such inner nut 8 would cause 0.007 inches of clearance for each 45° of its rotational movement of the inner axle nut 8 to realize the desired clearance. The selection of 12 threads per inch pitch for the outer axle nut 9 would provide the following conditions:

Considering rotational movement in the direction which effects closure between the two axle nuts 8, 9, the degree of rotation stated will close the initial gap between the two axle nuts 8, 9 providing the amount of linear movement of each nut 8, 9 along the axle spindle 1 as stated:

| Degrees of Rotation | Initial Gap | Linear Movement | |
|---|---|---|---|
| | | Outer Nut | Inner Nut |
| 30 | .010 | .006 | .004* |
| 60 | .020 | .012 | .008* |

(This constitutes a range of tapered roller bearing adjustment well within the range specified by all bearing manufacturers.)

To achieve the final clearance between 0.004 and 0.008 inches, it will require a spacing control device 10 in the outer nut that will engage one of the holes of the inner nut when the dimensional space between the two nuts, at the time the outer axle nut is being tightened, is no more than 0.020 inches nor less than 0.010 inches. To accomplish this, the contact face of the spacing control device should extend beyond the inner face of the outer axle nut at a distance of 0.020 inches. This will assure engagement of the spacing control device 10 within one of the holes of the inner axle nut at a relative position of the outer axle nut which will allow a coupled rotational movement of both nuts of at least 30 degrees, but not more than 60 degrees and this will produce the desired 0.004 inches to 0.008 inches of tapered roller bearing clearance.

Figure 21:
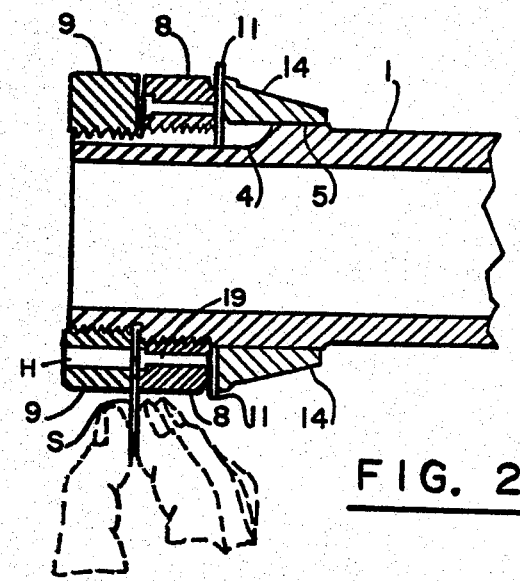
FIG. 21 is a cross-sectional view of part of the axle assembly of FIG. 3 illustrating one step of a different method.
Figure 22:
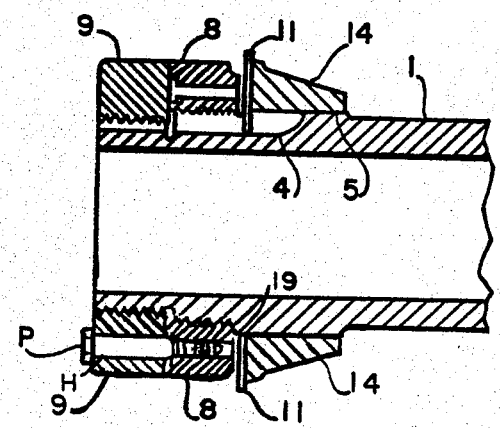
FIG. 22 is the same view as FIG. 21 but showing the final step.

An alternate procedure in FIGS. 21 and 22 provides the initial controlled clearance between the two axle nuts 8, 9 using an independent clearance shim S to establish the proper relationship between the inner axle nut 8 and the outer axle nut 9 before the inner nut 9 is backed off from the preload condition. With the relationship established, the threaded fastener bolt or pin P can be loosely installed through the retaining hole H in outer nut 9 to engage one of the eight threaded holes 19 in nut 8. At this stage, the spacing shim S would be withdrawn from the clearance space between nut 8 and nut 9 to allow for the simultaneous rotational movement of both nuts 8, 9 into the interlocked final adjusted position. Having established the appropriate clearance between the two axle nuts 8, 9 in the prepositioned relationship, placement of the threaded fastener P followed by removal of the independent spacing shim S enables the correct bearing clearance to be achieved with the coordinated rotational movement of both axle nuts into the locked relationship with respect to one another. Then, in this jammed condition, the threaded fastener bolt P can be tightened to achieve an additional securing force between the two axle nuts 8, 9 to assure maintenance of the final adjusted position.

A second alternate design will find favor within the industry because of its simplicity and the elimination of some of the precision parts shown in the initial configuration. It is possible to provide a self adjusting and self locking axle nut system without employing the spacing control device 10 included as part of the outer axle nut 9 in the first described system. This second alternate system is described as follows: the basic axle nuts 8, 9, as illustrated in FIGS. 3, 4, 5 and 6, are employed, but the spacing control device 10 portion of the outer nut 9 is omitted. Applying an adjustment procedure which will be identified as the "incremental turn technique", the axle nuts, 8, 9 because of their designed interrelationship, can be appropriately positioned and secured in their adjusted interlocked condition. This is accomplished by installing the inner axle nut 8 to the snug pretorqued relationship required to properly preposition all of the wheel and bearing components 5, 6, 7, 13, 15, etc. on the axle spindle. With the inner axle nut 8 in this significant position, the outer axle nut 9 is installed and its initial relative position with respect to the inner axle nut 8 will be in loose contact. It is now necessary to establish the appropriate gap between the two axle nuts 8, 9 before the coupled rotational movement of both nuts 8, 9 into the interlocked adjusted condition is initiated. To produce the appropriate initial gap, the "incremental turn technique" provides for the outer axle nut 9 to be rotated away from its loose contact against the inner axle nut 8. The amount of loosening rotation, considering the pitch of the threads selected in the example charted above, is controlled by reference to the flats F of the octagonal axle nuts 8, 9. In this example, rotation of the outer axle nut 9 so its flats F are repositioned to the second coinciding alignment with the flats F of the inner axle nut 8 will produce an initial gap between 0.010 inches and 0.020 inches. Having established this desired relationship, the two axle nuts 8, 9 are simultaneously rotated to the adjusted and interlocked condition and the resulting tapered roller bearing clearance will be less than 0.008 inches and more than 0.004 inches. This condition is in the middle of the range of 0.002–0.010 inches specified by the leading bearing manufacturers. In completing the installation, the securing fastener P will be installed to physically connect the two axle nuts 8, 9 which will prevent further relative movement.

While I have shown and described several versions of my invention this is by way of illustration and not limitation as there are other ways and various changes, alterations, eliminations, deviations and revisions which may be made in the embodiments shown without departing from the scope of my invention as defined only by a proper interpretation of the appended claims.

What is claimed is:

1. In a method for establishing the exact and final predetermined clearance required in a bearing and axle assembly to assure acceptable performance of roller bearings and conventional and axle components which are retained and maintained in a secured position on an axle spindle, the steps comprising:

placing an inner means such as an axle nut on the axle to establish the reference point with respect to the bearing on the axle, placing an outer means such as an axle nut on the axle and establishing the proper space between said inner and outer means based upon the distance required according to the final clearance, and thereafter while maintaining the relationship between said inner and outer means moving said inner and outer means a distance corresponding to the predetermined clearance.

2. The method in claim 1 including causing said inner and outer means to become relatively immovable with respect to each other at the predetermined clearance to prevent subsequent, significant relative movement therebetween.

3. The method in claim 2 wherein the proper space is established by placing a spacing member between said inner and outer means.

4. The method in claim 1 including providing inner and outer nuts and threads on the axle and determining said clearance according to the thread pitch and the rotation of the nuts.

5. The method in claim 4 including providing flat surfaces on the nuts, placing an inner nut against the bearing, placing the outer nut loosely against the inner nut, rotating the outer nut an increment based upon the relationship between the flat surfaces of the nuts and the pitch of the threads to produce an initial gap, then simultaneously rotating both nuts to provide the clearance with the bearing.

6. The method in claim 5 including causing said two nuts to become relatively immovable.

* * * * *